3,376,148
LABELING ADHESIVE
Peter S. Columbus, Whitestone, and Ronald T. Mason, New York, N.Y., assignors to The Borden Company, New York, N.Y., a corporation of New Jersey
No Drawing. Filed Feb. 16, 1965, Ser. No. 433,211
3 Claims. (Cl. 106—139)

ABSTRACT OF THE DISCLOSURE

This invention relates to water resistant casein labeling adhesives for fastening labels to bottles which are subject to immersion in ice and water to be chilled while labeled comprising water as the largest component, casein and a solubilizing agent for casein as the major dry components and from about 0.25 to about 12 parts by weight, for each 100 parts by weight of casein, of a water soluble gum selected from the group consisting of gum tragacanth, gum karaya, Irish moss, and mixtures thereof.

---

Patents Nos. 2,351,109, 2,351,309, 2,570,561 and 2,613,155 relate to such casein adhesives known to those skilled in the art as "iceproof" or "semi-iceproof" adhesives. These are adhesives that are resistant to the action of ice and water into which labeled bottled beverages are placed in order to chill the contents. The adhesives used must prevent separation of the label from the bottle under these conditions. In general, these adhesives have been successful, but they lack tack at low viscosities and do not have good machining properties. They tend to exhibit stringiness, build up on the labeling apparatus, and, because of their water resistance, are difficult to remove from the apparatus. The problem is particularly aggravated in adhesives in which the viscosity is lowered to permit their use in automatic systems requiring pumping of the adhesive through narrow piping to the labeling apparatus. In this latter case stringiness is even more severe and throwing becomes prevalent necessitating, in many instances, frequent shut-downs of the labeling apparatus for cleaning.

It has now been found that casein labeling adhesives can be prepared which are short-breaking (do not string), non-throwing, can be easily cleaned from the labeling apparatus, and which have a high-tack and fast rate-of-set even at low viscosities; i.e., viscosities of 15,000 to 20,0000 cps.

Briefly stated, the present invention comprises the addition to casein labeling adhesives of from 0.25 to about 12 parts by weight, for every 100 parts of casein in the adhesive, of a gum selected from the group consisting of gum tragacanth, gum karaya, Irish moss, and mixtures thereof.

As to materials, the components of the casein labeling adhesives, with the exception of the gums of the present invention, are well known in the art as set forth in the patents cited above. Such adhesives usually contain casein as the major solid component, a casein disperser or solubilizer such as urea, ammonium hydroxide, ammonium hydroxide, mixtures thereof and the like to disperse the casein, and, in addition, materials such as zinc acetate and zinc oxide to increase water resistance, defoamers, preservatives, shorteners such as soya bean alpha protein, and coloring agents.

As to proportions, water is the major component comprising usually about 50% by weight of the adhesive. The major dry solids components are the casein being about 20 to 25% by weight of the adhesive and the casein dispersant being about 15 to 20%. Typical formulations for such adhesives are set forth in the examples and in the patents referred to above.

The instant invention comprises the addition of certain critical water-soluble gums to the casein labeling adhesives described above. The specific gums required are gum tragacanth, gum karaya, Irish moss, and mixtures thereof. The proportions of such water-soluble gums added to give the effect required is from about 0.25 to about 12 parts by weight for each 100 parts of casein in the adhesive. Gum tragacanth is preferred because it gives the best machining properties over wide viscosity ranges and has the best storage stability.

The adhesives are preferably prepared by first dissolving the gum in the water and then admixing the other components in the usual manner. The viscosity range of the adhesives can be varied from about 15,000 to 60,000 cps. With more modern labeling apparatus in which the adhesive is pumped to the glue pot the lower viscosities are required. Adjustment of the viscosity is accomplished by varying the proportions of casein and casein dispersant within the ranges noted. Viscosity can also be adjusted by varying the amount of water in the formulation.

The invention will be further illustrated by the following examples, proportions here and elsewhere herein being expressed as parts by weight except where specifically stated to the contrary.

EXAMPLE 1

An adhesive is prepared having the following formula:

| | Parts |
|---|---|
| Water | 49.3 |
| Gum tragacanth | 1.5 |
| Zinc acetate·2 moles water | .4 |
| Zinc oxide (50% aqueous dispersion) | 1.0 |
| Urea | 19.6 |
| Ammonium thiocyanate | 1.0 |
| Soya bean alpha protein | 2.0 |
| Casein | 23.0 |
| Ammonium hydroxide 26° Bé. | 1.6 |
| Defoamer | .3 |
| Phenol | .3 |

The water and gum tragacanth are heated at 85° C. in a jacketed kettle to dissolve the gum. After the gum is dissolved, the solution is cooled to 45° C., the remaining ingredients are added, and the mixture, except for the phenol, heated to 75° C. for about 15 minutes. The adhesive formed is then cooled to 45° C., and the phenol added. The viscosity is about 16,000 cps. and pH is 7.8.

EXAMPLE 2

An adhesive is prepared having the same formula as that set forth in Example 1 with the exception that no gum tragacanth is used. The proportion of other materials in the formula is therefore slightly higher.

Since no gum is present, this adhesive is prepared by heating the mixture of the materials, save phenol, at 75° C. for about 15 minutes, after which the adhesive formed is cooled, the phenol added, and the adhesive removed from the drum. The viscosity was 16,000 cps. and pH 7.6.

EXAMPLE 3

The adhesive of Example 1 was supplied to a labeling apparatus (a standard World Tandem Labeler) used to apply labels to beer bottles. The apparatus operated for eight hour periods and longer without need for shut-down to clean the labeler.

The adhesive of Example 2 was then substituted for that of Example 1 and supplied to the same labeling appartus. Labels were applied to identical beer bottles at the same rate. Because of stringiness and throwing the labeler had to be shut down approximately every one-half hour because cleaning of the labeler was required.

Production rates consequently dropped when the adhesive of Example 2 was used. Also, the adhesive of Example 1 had a higher tack than that of Example 2 as measured on conventional tack-testing apparatus.

EXAMPLE 4

The composition and procedure of Example 1 is used except that 1 part by weight of gum karaya is substituted for the gum tragacanth therein used. Equally good machining and tack properties are obtained.

EXAMPLE 5

The composition and procedure of Example 1 are used except that 2.75 parts of Irish moss is substituted for the gum tragacanth therein used.

The adhesives of the present invention are suitable for bottles that are made of either glass or plastic such as polyethylene. Moreover, while they are water-resistant when dry the adhesives are soluble in warm water up to about 12 hours after application on the bottles. This enables ready removal of any of the adhesive on the labeling apparatus.

It will be understood that it is intended to cover all changes and modifications of the examples of the invention herein chosen for the purpose of illustration which do not constitute departures from the spirit and scope of the invention.

What is claimed is:

1. A casein adhesive for labeling glass and plastic bottles comprising, for each 100 parts by weight, water as its largest component, from about 20 to about 25 parts of casein, from about 15 to about 20 parts of an alkaline dispersing agent for casein, and from about 0.25 to about 12 parts by weight, for each 100 parts by weight of casein, of a water-soluble gum selected from the group consisting of gum tragacanth, gum karaya, Irish moss, and mixtures thereof in an amount less than the casein.

2. The casein adhesive of claim 1 wherein the water soluble gum is gum tragacanth.

3. The casein adhesive of claim 2, wherein the gum tragacanth is present in the proportion of from about 2 to about 4 parts by weight for each 100 parts by weight of casein.

References Cited

UNITED STATES PATENTS

| | | | |
|---|---|---|---|
| 2,441,101 | 5/1948 | Matthews et al. | 106—144 |
| 2,104,240 | 1/1938 | Pringle | 106—139 |
| Re. 25,884 | 10/1965 | Reiling | 106—129 |
| 2,970,063 | 1/1961 | Jordan et al. | 106—129 |
| 3,058,836 | 10/1962 | Sirota | 106—146 |
| 2,441,927 | 5/1948 | Adams | 106—129 |
| 2,350,732 | 6/1944 | Drew | 106—126 |
| 3,007,879 | 11/1961 | Jordan | 106—205 |

OTHER REFERENCES

I. Skeist: "Handbook of Adhesives," 2–64, p. 479.

ALEXANDER H. BRODMERKEL, *Primary Examiner.*

T. MORRIS, *Assistant Examiner.*